J. D. BOYD.
EGG HATCHING INCUBATOR.
APPLICATION FILED AUG. 26, 1911.
1,015,417.
Patented Jan. 23, 1912.
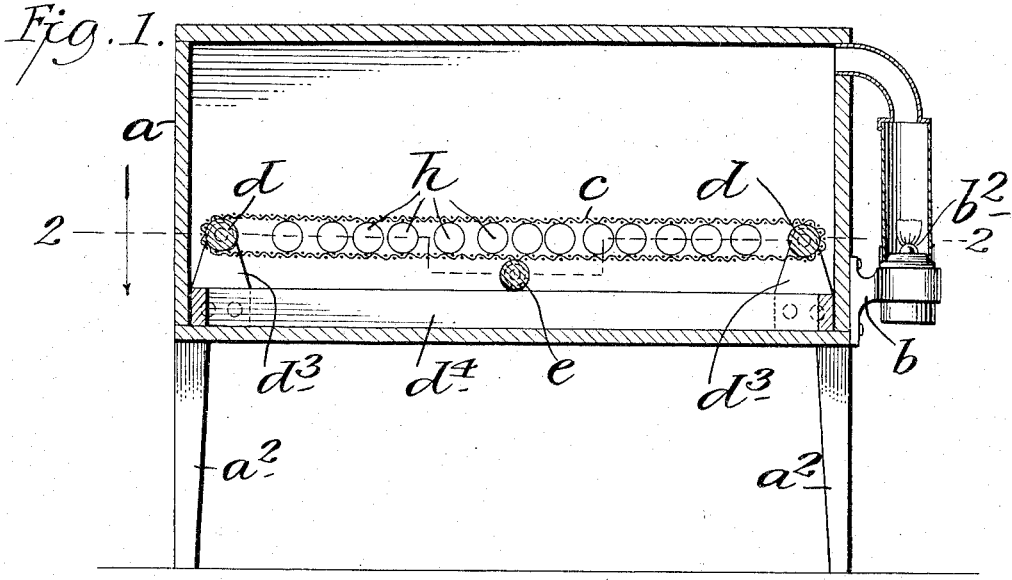
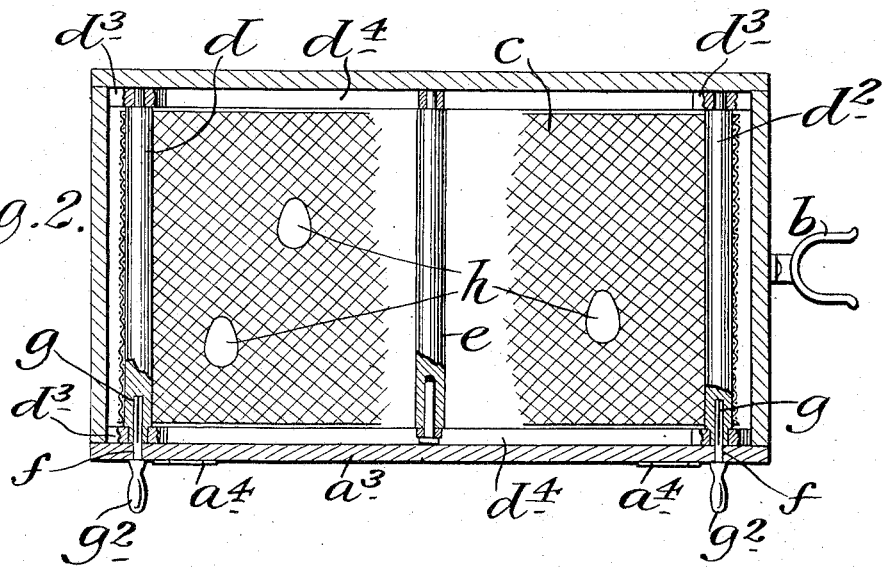
WITNESSES
INVENTOR
JAMES D. BOYD.
BY
ATTORNEYS

UNITED STATES PATENT OFFICE.

JAMES D. BOYD, OF ARROCHAR, NEW YORK.

EGG-HATCHING INCUBATOR.

1,015,417.  Specification of Letters Patent.  Patented Jan. 23, 1912.

Application filed August 26, 1911. Serial No. 646,224.

*To all whom it may concern:*

Be it known that I, JAMES D. BOYD, a citizen of the United States, and residing at Arrochar, in the county of Richmond and State of New York, have invented certain new and useful Improvements in Egg-Hatching Incubators, of which the following is a specification, such as will enable those skilled in the art to which it appertains to make and use the same.

This invention relates to incubators used for hatching eggs, and the object thereof is to provide an incubator of this class with improved means for supporting and turning the eggs during the process of hatching the same.

It is a well known fact that in the process of hatching eggs they must be turned regularly and the object of this invention is to provide a mechanical device for this purpose which may be operated without opening the incubator if desired, and by means of which the eggs may be exactly turned to any desired extent and as often as necessary, and which will serve as an egg holder, and which may be inserted into the frame or casing of the incubator in the manner of a tray.

The invention is fully disclosed in the following specification of which the accompanying drawing forms a part, in which the separate parts of my invention are designated by suitable reference characters in each of the views, and in which :—

Figure 1 is a sectional side view of an incubator of the class specified provided with my improvement, and; Fig. 2 a sectional plan view on the line 2—2 of Fig. 1.

In the drawing forming part of this specification I have shown an ordinary incubator frame or casing comprising a top body or a casing member $a$ supported by legs $a^2$, and one side, the side $a^3$ as shown in Fig. 2 is formed into a door which is hinged at the bottom as shown at $a^4$, and the body or casing of the incubator is provided at one end with a bracket $b$ for supporting a lamp $b^2$ by which the incubator body or casing is heated in the usual or any preferred manner, but it will be understood that my invention has nothing to do with the means for heating the incubator.

In the practice of my invention I provide an endless sheet or belt $c$ composed of wire mesh and mounted on two rollers $d$ and $d^2$ provided at the ends of the body or casing of the incubator and on the opposite sides thereof with supports $d^3$ into which the ends of the rollers $d$ and $d^2$ or the trunnions with which said rollers are provided may be dropped.

The supports $d^3$ in the construction shown, are formed on, or connected with a frame $d^4$ which with the endless sheet or belt $c$ mounted thereon, is adapted to be inserted into the casing of the incubator and removed therefrom in the manner of a tray.

Mounted centrally of and transversely of the frame $d^4$ is a third roller $e$ which serves as a support for the endless sheet or belt $c$ which constitutes the egg holder and turner proper, and in practice, the door $a^3$ is provided with apertures $f$ through which are passed pins $g$ adapted to enter axially formed recesses in the corresponding ends of the rollers $d$ and $d^2$, and these pins are provided with handles $g^2$, and the inner end portions thereof are preferably made angular in cross section as are also the said recesses, in the rollers $d$ and $d^2$, and when this device is inserted into the incubator, the door $a^3$ may be closed and the pins $g$ may be inserted into either of the rollers $d$—$d^2$ and said rollers may be turned so as to turn the endless sheet or belt $c$ in the required direction.

In practice, the eggs $h$, a number of which are shown in Fig. 1, and three of which are shown in Fig. 2, may be placed between the top and bottom parts of the endless sheet or belt $c$ and the diameter of the rollers $d$ and $d^2$ is such that the said eggs will approximately fill the space formed by the top and bottom portions of said endless sheet or belt, and said eggs will rest on the bottom portion of said sheet or belt and the top portion thereof will rest on said eggs, and when the rollers $d$ and $d^2$ are turned the eggs will also be turned without changing the relative positions in the tray or holder. It will thus be seen that the said eggs may be turned in either direction and to any extent whenever desired simply by manipulating one or both of the rollers $d$ and $d^2$ by means of the handles of the pins $g$, and in this operation and at all times the egg holder or carrier is maintained in a horizontal position by the roller $e$. The roller $e$, however, is not absolutely essential, but is preferably employed in incubators where the egg holder is of considerable dimensions longitudinally of the incubator.

It will also be understood that my improved egg turner and holder may be made of any desired dimensions according to the dimensions of the incubator in which it is to be used, and changes in and modifications of the construction herein described may be made, within the scope of the appended claims, without departing from the spirit of my invention or sacrificing its advantages.

Having fully described my invention, what I claim as new and desire to secure by Letters Patent, is:—

1. An egg holder and turner for incubators, comprising a frame, rollers mounted in connection therewith, and an endless openwork sheet passed around said rollers and between the top and bottom parts of which the eggs are placed, the dimensions and construction being such that the eggs rest on the bottom part of said sheet, while the top part thereof rests on the eggs.

2. An egg holder and turner for incubators, comprising a frame, rollers mounted in connection therewith, and an endless sheet of wire mesh mounted on said rollers and between the top and bottom parts of which the eggs are adapted to be placed, the dimensions and construction being such that when the eggs are placed in position they will rest on the bottom part of said sheet, while the top part thereof will rest on said eggs.

In testimony that I claim the foregoing as my invention I have signed my name in presence of the subscribing witnesses this 24th day of August 1911.

JAMES D. BOYD.

Witnesses:
C. E. MULREANY,
FRANK G. AT LEE.

---

Copies of this patent may be obtained for five cents each, by addressing the "Commissioner of Patents, Washington, D. C."